United States Patent
Kim et al.

(10) Patent No.: US 11,290,714 B2
(45) Date of Patent: Mar. 29, 2022

(54) MOTION-CONSTRAINED AV1 ENCODING METHOD AND APPARATUS FOR TILED STREAMING

(71) Applicant: Korea Electronics Technology Institute, Seongnam-si (KR)

(72) Inventors: Yong Hwan Kim, Anyang-si (KR); Ganzorig Gankhuyag, Seoul (KR); Jin Woo Jeong, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 16/424,556

(22) Filed: May 29, 2019

(65) Prior Publication Data
US 2020/0162731 A1     May 21, 2020

(30) Foreign Application Priority Data

Nov. 15, 2018    (KR) ........................ 10-2018-0140511

(51) Int. Cl.
*H04N 19/117*     (2014.01)
*H04N 19/52*      (2014.01)
(Continued)

(52) U.S. Cl.
CPC ......... *H04N 19/117* (2014.11); *H04N 19/124* (2014.11); *H04N 19/139* (2014.11);
(Continued)

(58) Field of Classification Search
USPC .................................................. 375/240.16
See application file for complete search history.

(56) References Cited

U.S. PATENT DOCUMENTS

| | | | |
|---|---|---|---|
| 2012/0163452 A1* | 6/2012 | Horowitz | H04N 19/159 375/240.12 |
| 2013/0107973 A1* | 5/2013 | Wang | H04N 19/82 375/240.29 |

(Continued)

OTHER PUBLICATIONS

Grange et al., "VP9 Bitstream & Decoding Process Specification", Version 0.6, Mar. 31, 2016 (Year: 2016).*

(Continued)

*Primary Examiner* — Christopher S Kelley
*Assistant Examiner* — Ana Picon-Feliciano
(74) *Attorney, Agent, or Firm* — NSIP Law

(57) ABSTRACT

There is provided a motion-constrained AV1 encoding method and apparatus for tile-based streaming of an ultra-high definition image, which encodes an image such that the image can be decoded by integrating tile-based segmented images at a bit stream level without modifying an AV1 standard decoder. According to an embodiment of the present disclosure, the motion-constrained encoding method includes: limiting a motion prediction range based on a format and a size of an image; and predicting motion vectors regarding tiles constituting the image, based on the limited motion prediction range. Accordingly, a tile-based streaming service is possible through motion-constrained AV1 encoding of an ultra-high definition image (360 VR image or panorama image). In addition, a consumer electronic device is enabled to integrate and decode segmented images by using a single standard AV1 decoder.

19 Claims, 9 Drawing Sheets

(51) Int. Cl.
*H04N 19/139* (2014.01)
*H04N 19/176* (2014.01)
*H04N 19/124* (2014.01)
*H04N 19/82* (2014.01)
*H04N 19/196* (2014.01)
*H04N 19/523* (2014.01)

(52) U.S. Cl.
CPC ......... *H04N 19/176* (2014.11); *H04N 19/196* (2014.11); *H04N 19/52* (2014.11); *H04N 19/523* (2014.11); *H04N 19/82* (2014.11)

(56) References Cited

U.S. PATENT DOCUMENTS

| | | | | |
|---|---|---|---|---|
| 2016/0165248 | A1* | 6/2016 | Lainema | H04N 19/107 375/240.08 |
| 2017/0163994 | A1* | 6/2017 | Sanchez De La Fuente | H04N 19/436 |
| 2017/0163999 | A1* | 6/2017 | Li | H04N 19/137 |
| 2018/0054613 | A1* | 2/2018 | Lin | H04N 19/167 |
| 2019/0045185 | A1* | 2/2019 | Fu | H04N 19/124 |
| 2019/0158935 | A1* | 5/2019 | Denoual | H04N 19/188 |
| 2019/0208217 | A1* | 7/2019 | Zhou | H04N 19/593 |
| 2019/0394482 | A1* | 12/2019 | Joshi | H04N 19/46 |
| 2020/0336740 | A1* | 10/2020 | Fang | H04N 21/816 |
| 2020/0344499 | A1* | 10/2020 | Fang | H04N 21/235 |
| 2021/0152828 | A1* | 5/2021 | Sjoberg | H04N 19/593 |
| 2021/0168404 | A1* | 6/2021 | Lim | H04N 19/70 |

OTHER PUBLICATIONS

C. Concolato et al., "Adaptive Streaming of HEVC Tiled Videos Using MPEG-DASH," in IEEE Transactions on Circuits and Systems for Video Technology, vol. 28, No. 8, pp. 1981-1992, Aug. 2018, doi: 10.1109/TCSVT.2017.2688491. (Year: 2018).*

Laude et al, 2018 (T. Laude, Y. G. Adhisantoso, J. Voges, M. Munderloh and J. Ostermann, "A Comparison of JEM and AV1 with HEVC: Coding Tools, Coding Efficiency and Complexity," 2018 Picture Coding Symposium (PCS), 2018, pp. 36-40, doi: 10.1109/PCS.2018.8456291). (Year: 2018).*

Lee et al, 2013 (Jinho Lee, Hui Yong Kim, Sung-Chang Lim, Jin Soo Choi, "Constrained in-loop filtering for error resiliency in high efficiency video coding," Opt. Eng. 52(7) 071507 (Apr. 12, 2013) https://doi.org/10.1117/1.OE.52.7.071507). (Year: 2013).*

Topiwala et al, 2017(Pankaj Topiwala, Wei Dai, Madhu Krishnan, "FastVDO enhancements of the AV1 codec and comparison to HEVC and JVET codecs," Proc. SPIE 10396, Applications of Digital Image Processing XL, 103960D (Sep. 19, 2017); https://doi.org/10.1117/12.2273835). (Year: 2017).*

Topiwala et al, 2018 (Pankaj Topiwala, Madhu Krishnan, Wei Dai, "Performance comparison of VVC, AV1, and HEVC on 8-bit and 10-bit content," Proc. SPIE 10752, Applications of Digital Image Processing XLI, 107520V (Sep. 17, 2018); https://doi.org/10.1117/12.2322024). (Year: 2018).*

Korean Office Action dated Mar. 5, 2020 in corresponding Korean Patent Application No. 10-2018-0140511 (1 page in English, 3 pages in Korean).

Chen et al., "An Overview of Core Coding Tools in the AV1 Video Codec," 2018 Picture Coding Symposium, Oct. 6, 2018, 5 pages.

* cited by examiner

1. Modification of HEVC encoder inter prediction mode
   - Integer motion vector range
   - Fractional motion vector range
   - Motion vector prediction 2. Modification of HEVC encoder parameter flag
   - De-blocking filter FLAG
   - Sample adaptive offset filter FLAG

FIG. 2

(Related Art)

1. Modification of AV1 encoder frame header parameter
   - GF interval FIX
   - Global motion FLAG OFF
   - Segmentation map OFF 2. Modification of AV1 encoder inter prediction mode
   - Integer motion vector range
   - Fractional motion vector range
   - Motion vector prediction 3. Modification of AV1 encoder in-loop filter
   - De-blocking filter restriction
   - CDEF filter restriction
   - Restoration filter restriction

FIG. 3

MOTION-CONSTRAINED AV1 ENCODING METHOD AND APPARATUS FOR TILED STREAMING

CROSS-REFERENCE TO RELATED APPLICATION(S) AND CLAIM OF PRIORITY

This application is based on and claims priority under 35 U.S.C. § 119 to Korean Patent Application No. 10-2018-0140511, filed on Nov. 15, 2018, in the Korean Intellectual Property Office, the disclosure of which is herein incorporated by reference in its entirety.

BACKGROUND

Field

The present disclosure relates generally to a motion-constrained alliance for open media (AOMedia) video codec 1.0 (AV1) encoding method for tile-based streaming of an ultra-high definition (8K, 16K) image (a 360 VR image, a panorama image), and more particularly, to an AV1 encoding method which sets a motion prediction search range, limits filtering of loop filters on a picture/tile boundary portion, and solves a frame header synchronization problem of each segmented image to perform AV1 motion-constrained encoding.

Description of Related Art

1) Gist of the AV1 Video Codec

The alliance for open media (AOMedia) announced the AOMedia video codec 1.0 (AV1) compression standards, which can be used royalty-free, on Mar. 28, 2018. Main functions of the AV1 compression standards are to provide a compression algorithm which is more efficient than existing video codecs (ISO/IEC & ITU-T HEVC) by 30%, a hardware and software (single instruction multiple data; SIMD) calculation-friendly structure, and maximum flexibility and extensibility including 8K and high dynamic range (HDR) images.

The AV1 segments an image in the unit of a superblock which has a pixel size of 64×64 or 128×128, and then performs compression/restoration in the unit of a superblock. In addition, the AV1 does not have the concept of slice unlike exiting video codecs, and may perform parallel processing through tiles.

2) Gist of Tile-Based Streaming

To stream an ultra-high definition video, such as a 360 VR image and panorama image of 8K (7680×4320)/16K (15360×8640), there is a need for technology for solving three problems: 1) a lack of a network bandwidth, 2) a lack of ability to process ultra-high definition data of a streaming server for a plurality of clients, and 3) a lack of ability of a consumer electronic device to reproduce data.

Users' viewing characteristic of the 360 VR image and the panorama image is seeing only some regions (field of view (FOV)) in a moment, rather than seeing an entire region at a glance. That is, users see some regions while moving vertically and horizontally in order to see the entire region.

Tile-based streaming technology refers to a method which does not stream ultra-high definition image data at one time, and segments the image into tiles in advance, and adaptively streams only a region currently viewed by a user. When this method is used, all of the above-described three problems may be solved.

To provide the tile-based streaming service, video codecs should support "tile"-based independent compression/restoration. Currently, standard video codecs, high-efficiency video coding (HEVC) and AV1, are the only ones supporting tiles. Herein, the reason why the "tile" is important is that a consumer electronic device can integrate segmented images (that is, tiles) into a single bit stream at a bit stream level (that is, bit stream stitching), and can reproduce the image through a single 4K standard decoder.

The main idea of the tile-based streaming is segmenting an ultra-high definition image (8K or 16K) horizontally and vertically, and adaptively streaming independently encoded segmented images. Accordingly, a user has only to adaptively receive only a stream of segmented images including a corresponding FOV needed by the user.

FIG. 1 illustrates the concept of tile-based video streaming for 360° VR streaming as described above. In FIG. 1, segmented images are transmitted to a client through a method such as dynamic adaptive streaming over HTTP (DASH), etc.

3) Related-Art Method: Tile-Based Video HEVC Encoding Method

Tile-based 360° VR video streaming methods using a HEVC codec have been suggested. FIG. 2 illustrates a motion-constrained encoding method of a tile-based HEVC encoder.

There is a method for searching an integer motion vector and searching a fractional motion vector in an inter prediction mode of HEVC encoding. This method puts a limit by readjusting the vector search range, such that there is no vector crossing a tile boundary. In addition, this method puts a limit so as to use only a motion vector in the same tile when the motion vector is predicted in the inter prediction mode. This method removes a correlation between neighboring tiles in the inter prediction mode.

In addition, a flag "loop_filter_across_tiles_enables_flag_set" existing in a picture parameter set (PPS) of the HEVC encoder is set to 0. This flag is a flag for limiting a deblocking filter and a sample adaptive offset filter, which are in-loop filters, at pixels existing on a boundary portion between tiles when an image formed of tiles is decoded at a decoder. That is, the in-loop filter is not used on a boundary portion of tiles.

Various prediction methods and filtering limitations may cause a small reduction of a compression rate (that is, an increase of a bit rate) in the light of an encoder, but this is negligible for a streaming service of an ultra-high definition image.

As described above, motion-constrained compression of HEVC may use the option of not executing a loop filter on a tile boundary, and may use other known limitations. However, in the case of AV1, there is no option that a loop filter is not executed on a tile boundary. Therefore, there is a need for a method for solving this problem.

SUMMARY

To address the above-discussed deficiencies of the prior art, it is a primary object of the present disclosure to provide a tile-based encoding method and apparatus which is suitable for characteristics of AV1.

In particular, an object of the present disclosure is to provide a motion-constrained AV1 encoding method and apparatus for tile-based streaming of a ultra-high definition image, which encodes an image such that the image can be decoded by integrating tile-based segmented images at a bit stream level without modifying an AV1 standard decoder.

According to an embodiment of the present disclosure to achieve the above-described objects, a motion-constrained encoding method of a tile-based AV1 image includes: limiting a motion prediction range based on a format and a size of an image; and predicting motion vectors regarding tiles constituting the image, based on the limited motion prediction range.

The limiting may include, in the case of a YCbCr 4:2:0 format, when a prediction is made in the unit of an integer luma pixel, limiting the motion prediction range according to the following conditions:
if CBWS≤8, an X-axis has a range excluding {1, TWBS-1} from [0, TWBS],
if CBWS>8, the X-axis has a range excluding {1, 3, 5, TWBS-5, TWBS-3, TWBS-1} from [0, TWBS],
if CBHS≤8, a Y-axis has a range excluding {1, THBS-1} from [0, THBS],
if CBHS>8, the Y-axis has a range excluding {1, 3, 5, THBS-5, THBS-3, THBS-1} from [0, THBS].

The limiting may include, in the case of a YCbCr 4:2:0 format, when a predication is made in the unit of a factional luma pixel, limiting the motion prediction range according to the following conditions:
if CBWS≤8, the X-axis is [3, TWBS-4],
if CBWS>8, the X-axis is [6, TWBS-7],
if CBHS≤8, the Y-axis is [3, THBS-4],
if CBHS>8, the Y-axis is [6, THBS-7].

The limiting may include, in the case of a YCbCr 4:2:2 format, when a predication is made in the unit of an integer luma pixel, limiting the motion prediction range according to the following conditions:
if CBWS≤8, the X-axis has a range excluding {1, TWBS-1} from [0, TWBS],
if CBWS>8, the X-axis has a range excluding {1, 3, 5, TWBS-5, TWBS-3, TWBS-1} from [0, TWBS],
the Y-axis is [0, THBS]; and
when a prediction is made in the unit of a fractional luma pixel, limiting the motion prediction range according to the following conditions:
if CBWS≤8, the X-axis is [3, TWBS-4],
if CBWS>8, the X-axis is [6, TWBS-7],
if CBHS≤4, the Y-axis is [1, THBS-2],
if CBHS>4, the Y-axis is [3, THBS-4].

The limiting may include, in the case of a YCbCr 4:4:4, YCbCr 4:0:0, or an RGB format, when a prediction is made in the unit of an integer luma pixel, limiting the motion prediction range according to the following conditions:
the X-axis is [0, TWBS],
the Y-axis is [0, THBS], and
when a prediction is made in the unit of a fractional luma pixel, limiting the motion prediction range according to the following conditions:
if CBWS≤4, the X-axis is [1, TWBS-2],
if CBWS>4, the X-axis is [3, TWBS-4],
if CBHS≤4, the Y-axis is [1, THBS-2],
if CBHS>4, the Y-axis is [3, THBS-4].

The method may further include setting a parameter of a DF at a tile boundary block as follows:
deltaLF[0 . . . 3]=−loop_filter_level[0 . . . 3],
delta_lf_present=1,
loop_filter_delta_enabled=0.

The method may further include setting a loop_filter_level value existing in a frame header to be calculated based on a base_q_idx value, and setting quantization parameter index values of all tile images to be made equal.

The method may further include: setting cdef_idx to indicate actual strength with a value of 0 at a tile boundary block; and setting restoration_type=RESTORE_NONE at the tile boundary block.

The method may further include: setting "allow_warped_motion=0" and "segmentation_enabled=0" in a header parameter of a tile-based AV1 image frame; fixing interpolation_filter to one identical value in the header parameter of the tile-based AV1 image frame; and fixing a golden frame (GF) group and a key frame interval of an AV1 encoder to a same value.

According to another embodiment, a transcoding system may include: an input unit configured to receive an input of an image; and a processor configured to limit a motion prediction range based on a format and a size of a tile-based AV1 image, and to predict motion vectors regarding tiles constituting the image based on the limited motion prediction range.

According to still another embodiment, a motion-constrained encoding method of a tile-based AV1 image includes: predicting motion vectors regarding tiles constituting an image, based on a motion prediction range limited based on a format and a size of the image; and encoding the image by using the predicted motion vectors.

According to yet another embodiment, a transcoding system may include: a processor configured to predict motion vectors regarding tiles constituting an image, based on a motion prediction range limited based on a format and a size of a tile-based AV1 image, and to encode the image by using the predicted motion vector; and an output unit configured to output the encoded image.

According to embodiments of the present disclosure as described above, a tile-based streaming service is possible through motion-constrained AV1 encoding of an ultra-high definition image (360 VR image or panorama image). In addition, according to embodiments of the present disclosure a consumer electronic device is enabled to integrate and decode segmented images by using a single standard AV1 decoder.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 is a view illustrating a motion-constrained HEVC encoder modification method;

FIG. 3 is a view illustrating a motion-constrained AV1 encoder modification method;

DETAILED DESCRIPTION

Hereinafter, the present disclosure will be described in detail with reference to the accompanying drawings.

Embodiments of the present disclosure provide a motion vector-constrained tile-based encoding method which is suitable for characteristics of an AV1 codec as shown in FIG. 3. Embodiment of the present disclosure relate to encoding various tiles originally having a correlation therebetween into segmented images having a limitation to the correlation.

To achieve this, three operations, 1) modifying AV1 encoder parameters, 2) modifying an AV1 encoder inter prediction mode, and 3) modifying an AV1 encoder in-loop filter, are performed as shown in FIG. 3.

Accordingly, motion-constrained AV1 encoding for tile-based streaming can be used at each part by removing or minimizing a correlation between tiles. In addition, an encoding speed can be slightly increased by performing the method suggested in embodiments of the present disclosure.

AV1 motion-constrained encoding has a fundamental difference from HEVC motion-constrained encoding. The difference is whether there exists a slice. Since HEVC has an individual slice header in each tile, there is no problem even if parameters influencing all of the slices are different. However, AV1 has no concept of slice, and all tiles refer to one frame header. Therefore, many parameters included in the frame header should be matched (synchronized).

1) Modifying AV1 Encoder Frame Header Parameters

The global motion prediction and local motion prediction method is one of the coding methods newly introduced by the AV1 standards.

The global motion prediction method refers to a method which obtains motion vectors of a current frame to be predicted, reference frames, and a whole image, and enables the global motion vectors to be used at respective superblocks. In addition, the local motion prediction method refers to a method which calculates a motion vector through affine transform by using motion vectors of neighboring prediction blocks. Accordingly, the globally predicted motion parameters are included in a frame header.

Figure 1:
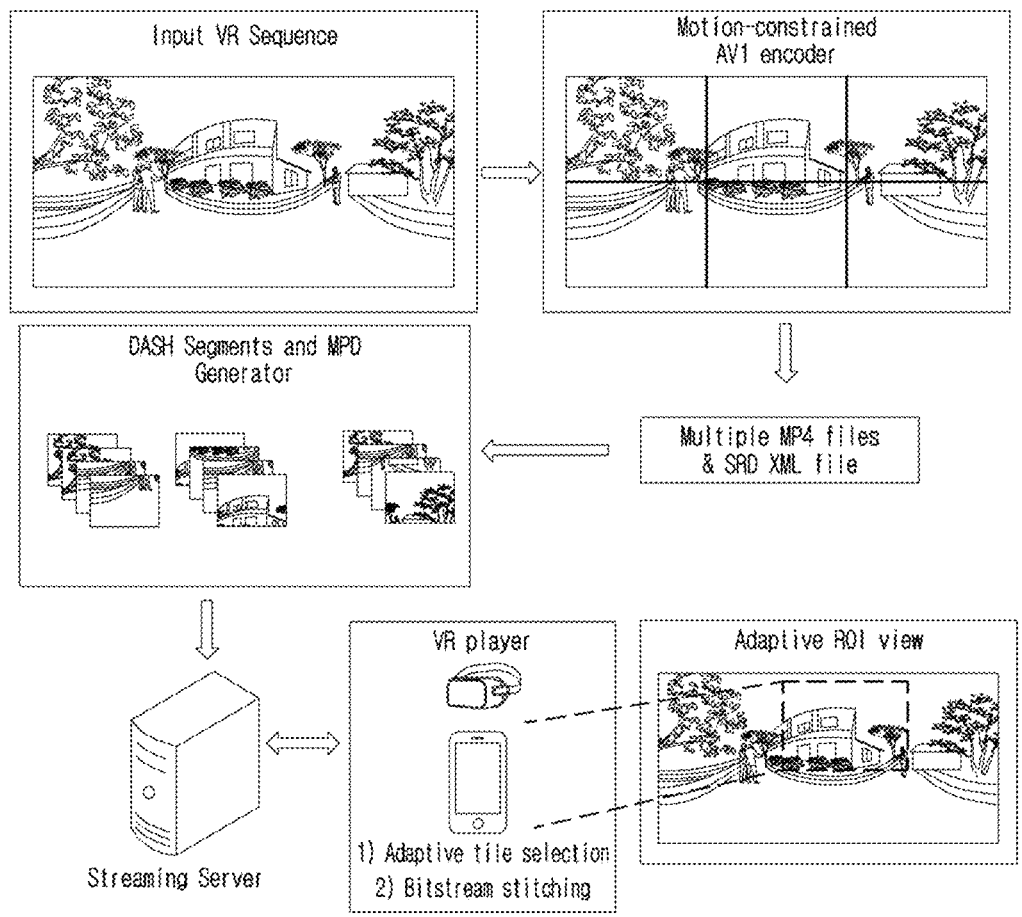
FIG. 1 is a view illustrating a tile-based 360 VR image streaming system.
Figure 4:
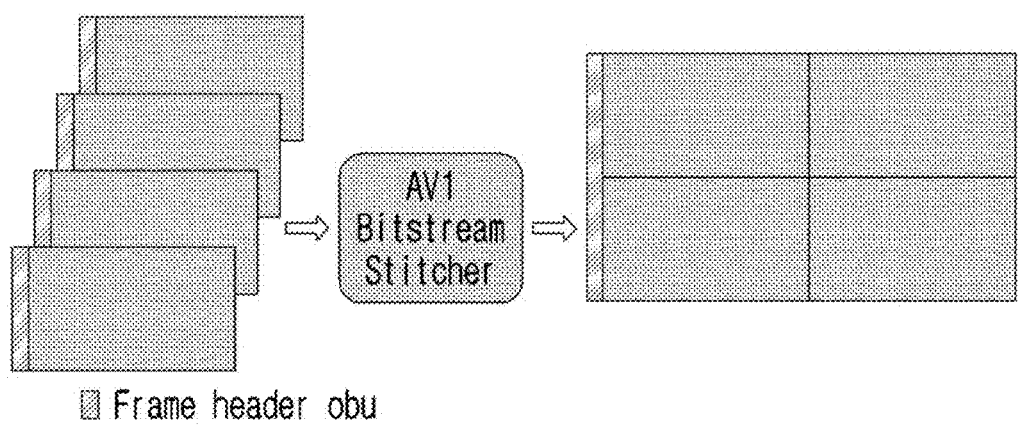
FIG. 4 is a view illustrating an example of a single frame header by bit stream stitching.

This technology cannot be used in tile-based streaming which integrates segmented images and decodes the images into a single image. This is because a client in a tile-based streaming system uses single stream decoding as shown in FIG. 4, and thus there is only a single frame header after segmented images are integrated into a bit stream, and there is only a single global motion parameter in the frame header. That is, different global motion parameter data corresponding to various tiles may not be included and used in the single frame header. The single stream is generated by a bitstream stitcher shown in FIG. 4, and the stitched stream is a single stream which does not use global/local motion parameters.

As a result, the following values of all frame headers at an AV1 encoder should be set to 0:
allow_warped_motion=0
segmentation_enabled=0

The following values of the frame headers should be fixed:
interpolation_filter=fixed to the same single value: At the AV1 encoder, the interpolation_filter may select one of the five values (EIGHTTAP, EIGHTTAP_SMOOTH, EIGHTTAP_SHARP, BILINEAR, SWITCHABLE) adaptively according to a frame.

In addition, a golden frame (GF) group and a key frame interval of the AV1 encoder should be fixed due to the limitation of the single frame header.

2) Modifying an AV1 Encoder Inter Prediction Mode

When a motion is predicted, a motion vector should not cross a picture boundary. An allowable range of the motion vector is influenced by the following three items:

a) Picture chroma sampling format;

b) 8-tap interpolation filter of AV1 for predicting a $\frac{1}{8}^{th}$-pel unit of a luma pixel and for predicting a $\frac{1}{16}^{th}$-pel unit of a chroma pixel; and c) the height and width of a prediction block (pixel unit)
if the width of a luma or chroma block is equal to or less than 4, a 4-tap filter or an 8-tap filter
if the height of a luma or chroma block is equal to or less than 4, a 4-tap filter or an 8-tap filter In embodiments of the present disclosure, the range of the motion vector is limited by reflecting the three items described above as in equations presented below.

2.1) Range when a Prediction is Made in the Unit of an Integer Luma Pixel 2.1.1.) YCbCr 4:2:0 Format: (Chroma x, y Pixel Coordinates Generate a Fractional Number)

if CBWS≤8, the X-axis has a range excluding {1, TWBS-1} from [0, TWBS].
if CBWS>8, the X-axis has a range excluding {1, 3, 5, TWBS-5, TWBS-3, TWBS-1} from [0, TWBS].
if CBHS≤8, the Y-axis has a range excluding {1, THBS-1} from [0, THBS].

if CBHS>8, the Y-axis has a range excluding {1, 3, 5, THBS-5, THBS-4, THBS-1} from [0, THBS].

2.1.2) YCbCr 4:2:2 Format: (Chroma×Pixel Coordinates Generate a Fractional Number)

if CBWS≤8, the X-axis has a range excluding {1, TWBS-1} from [0, TWBS].
if CBWS>8, the X-axis has a range excluding {1, 3, 5, TWBS-5, TWBS-3, TWBS-1} from [0, TWBS].
the Y-axis is [0, THBS].

2.1.3) Format which is not Chroma Sub Sampled Such as YCbCr 4:4:4 or YCbCr 4:0:0 or RGB, etc.

the X-axis is [0, TWBS]
the Y-axis is [0, THBS]

2.2) Range When a Prediction is Made in the Unit of a Fractional Luma Pixel

2.2.1) YCbCr 4:2:0 Format if CBWS≤8, the X-axis is [3, TWBS-4].
if CBWS>8, the X-axis is [6, TWBS-7].
if CBHS≤8, the Y-axis is [3, THBS-4].
if CBHS>8, the Y-axis is [6, THBS-7].

2.2.2) YCbCr 4:2:2 Format if CBWS≤8, the X-axis is [3, TWBS-4].
if CBWS>8, the X-axis is [6, TWBS-7].
if CBHS≤4, the Y-axis is [1, THBS-2].
if CBHS>4, the Y-axis is [3, THBS-4]

2.2.3) Format Which is Not Chroma Sub Sampled Such as YCbCr 4:4:4 or YCbCr 4:0:0: or RGB, etc.

if CBWS≤4, the X-axis is [1, TWBS-2].
if CBWS>4, the X-axis is [3, TWBS-4].
if CBHS≤4, the Y-axis is [1, THBS-2].
if CBHS>4, the Y-axis is [3, THBS-4].

In the above-described equations, ref_x refers to a pixel unit x coordinate of a reference picture, ref_y refers to a y coordinate, TWBS=Tile_Width_Size-Current_Block_Width_Size (CBWS), and THBS=Tile_Height_Size-Current_Block_Height_Size (CHBS).

Figure 5:
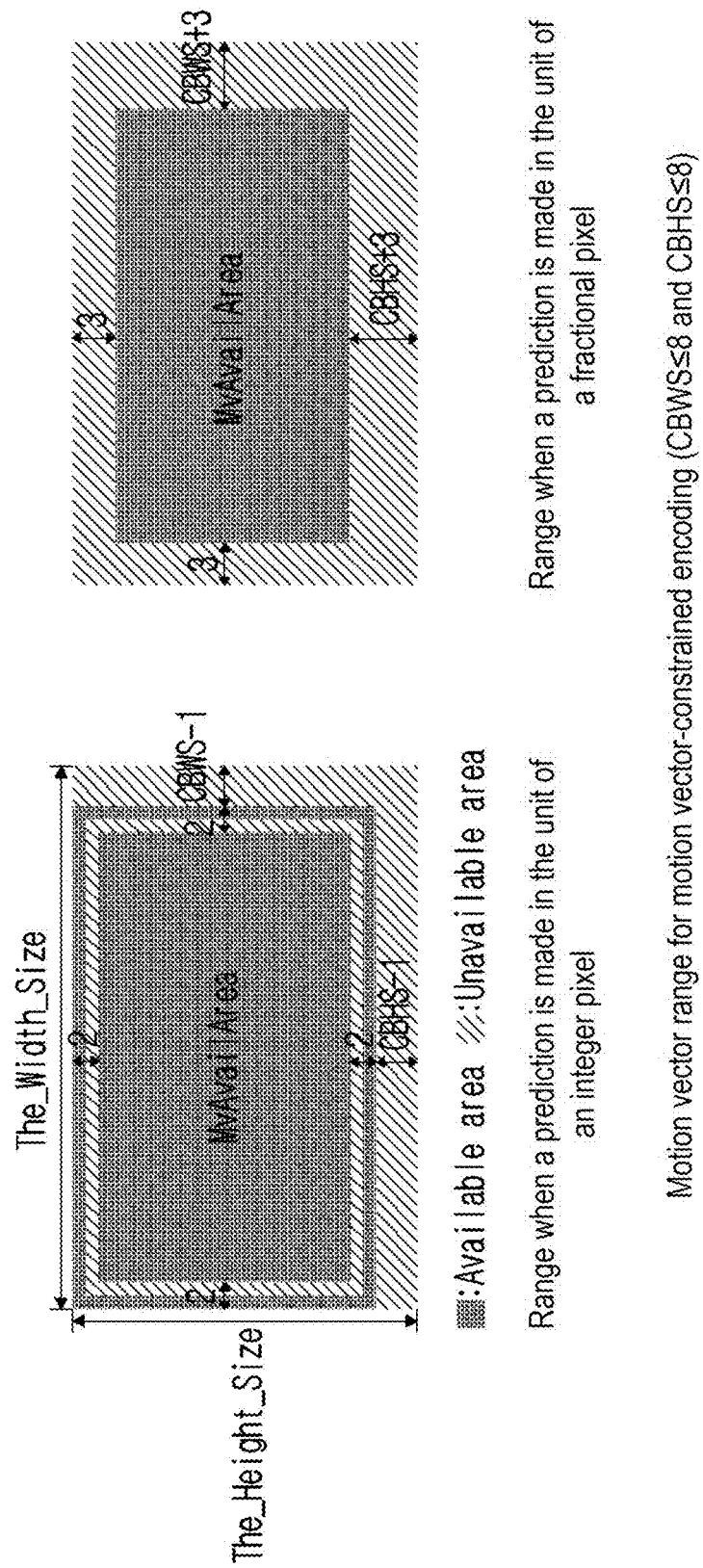
FIG. 5 is a view illustrating a motion vector range for motion vector-constrained encoding (CBWS≤8 and CBHS≤8)
Figure 6:
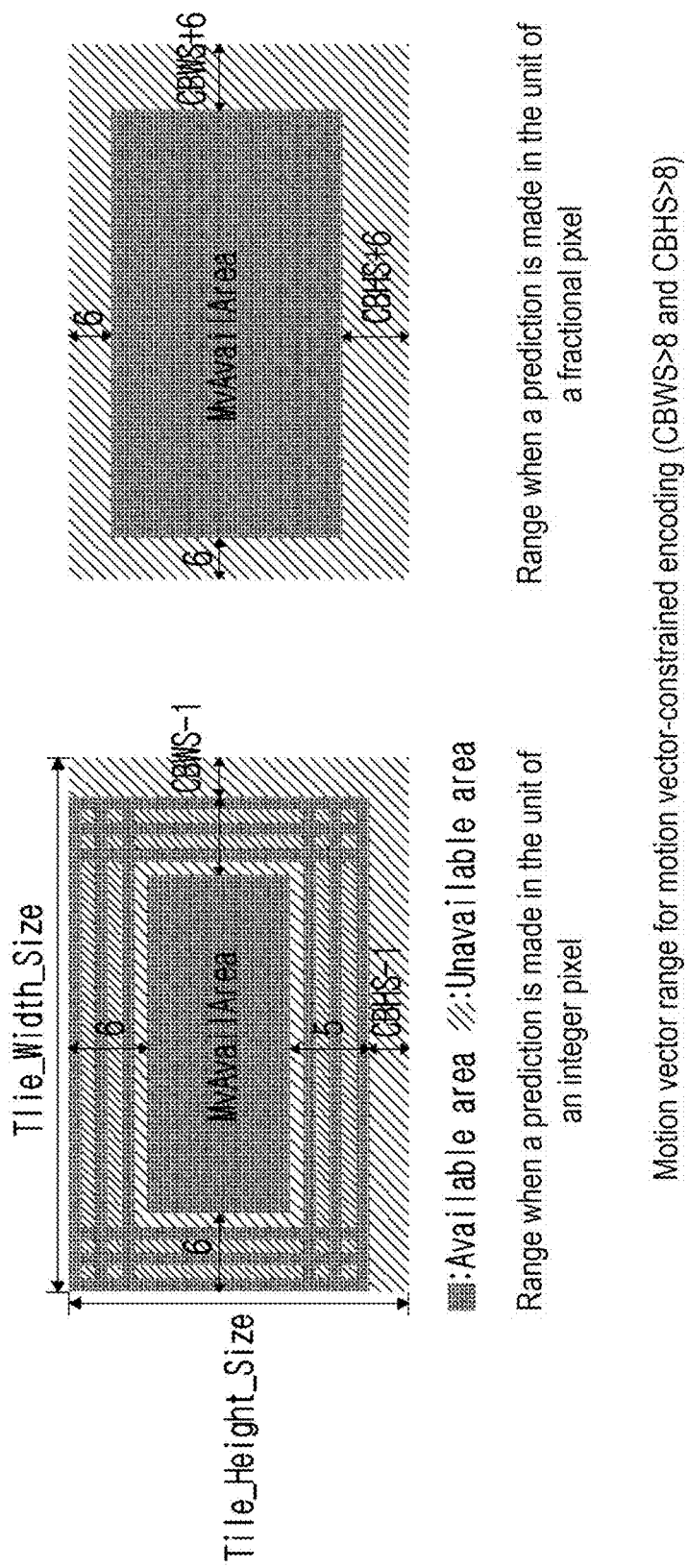
FIG. 6 is a view illustrating a motion vector range for motion vector-constrained encoding (CBWS>8 and CBHS>8)

A motion vector range of inter prediction in the YCbCr 4:2:0 chroma format is shown in FIGS. 5 and 6.

3) Modifying AV1 Encoder In-Loop Filter Parameters

AV1 enhances quality of a decoded image by using a loop filter. The AV1 standards provide the following three filters: A) a deblocking filter (DF), B) a constrained directional enhancement filter (CDEF), and C) a loop restoration filter (LRF). These three filters are executed in sequence (DF→CDEF→LRF) in a coding loop.

According to the AV1 encoding standards, there is no flag that disables the in-loop filter on a tile boundary portion. Accordingly, the DF, the CDEF, and the LRF should be modified to be disabled on the tile boundary portion. In addition, there is a need for modification to match all of the frame parameter data of the DF, the CDEF, and the LRF that may be sent to a frame header of various segmented images, since the integrated single stream is decoded.

3.1) Limiting Picture Boundary Block Filtering and Limiting Frame Parameter Values of the DF The AV1 DF may apply a narrow filter, a wide filter, or a no filter in the unit of each block. In embodiments of the present disclosure, the no filter is set at a block positioned on the picture boundary portion and DF filtering is not performed on the picture boundary. In addition, some parameter values of the frame header need to be modified to synchronize the frame header.

3.1.1) Limiting DF Filtering at a Picture Boundary Block

A DF limiting method suggested in embodiments of the present disclosure will be described. First, it is determined whether an input block of the DF is a picture boundary block. When the input block is the boundary block, the DF limiting method suggested in embodiments of the present disclosure is performed, and, when the input block is not the boundary block, a normal DF is applied.

A condition where a lvl value is equal to 0 should be satisfied to set the block positioned on the picture boundary to the no filter (lvl=0).

Figure 7:
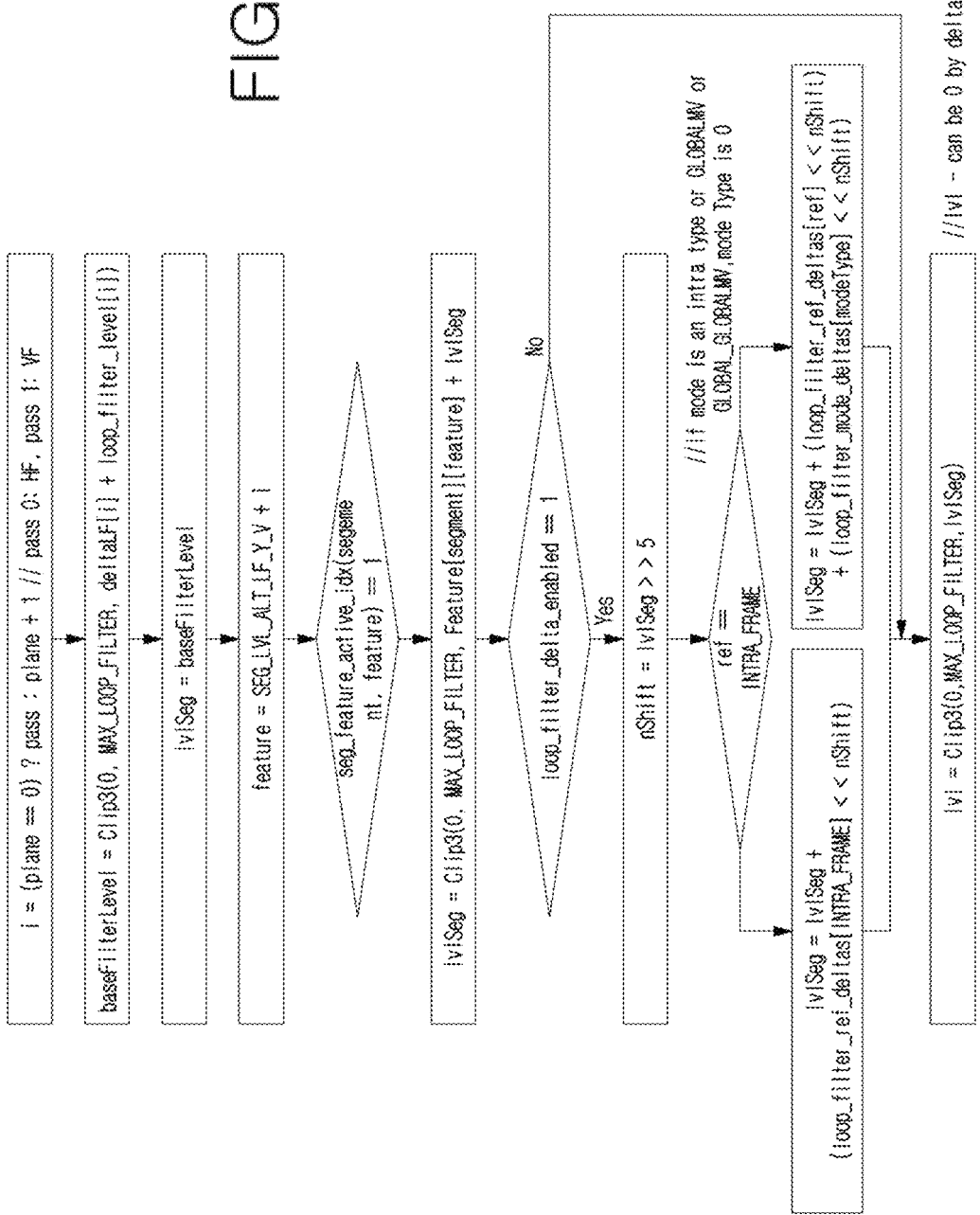
FIG. 7 is a view illustrating a method for calculating a block lvl value of an AV1 DF.

The lvl value can be calculated as shown in FIG. 7.

In FIG. 7, HF refers to horizontal filtering, VF refers to vertical filtering, and the lvl value indicates a filtering strength of the DF. loop_filter_level is included in THE frame header, and deltaLF is a value that is transmitted and calculated in every superblock. In addition, segment and loop_filter_delta_enabled value are not used, such that only the equations expressed in bold type in FIG. 7 influence the lvl value.

In embodiments of the present disclosure, deltaLF is set at the picture boundary block according to Equation 9 presented below, in order to set the lvl value to 0 at the block positioned on the picture boundary:

$$\text{delta}LF[0\ldots3]=-\text{loop\_filter\_level}[0\ldots3] \qquad \text{Equation 9}$$

In addition, the following values are set in the frame header to change the deltaLF value in a superblock-basis:
delta_lf_present=1,
loop_filter_delta_enabled=0

3.1.2) Limiting a DF Parameter Value for Synchronizing the Frame Header

The DF parameter should maintain the loop_filter_level value existing in the frame header as the same value in each segmented image to have the same setting. To achieve this condition, the loop_filter_level value is set to be calculated based on the base_q_idx value, and then the base_q_idx values of all segmented images are made equal. As a result, the loop_filter_level values are made equal. Herein, base_q_idx is a quantization parameter index included in the frame header.

Figure 8:
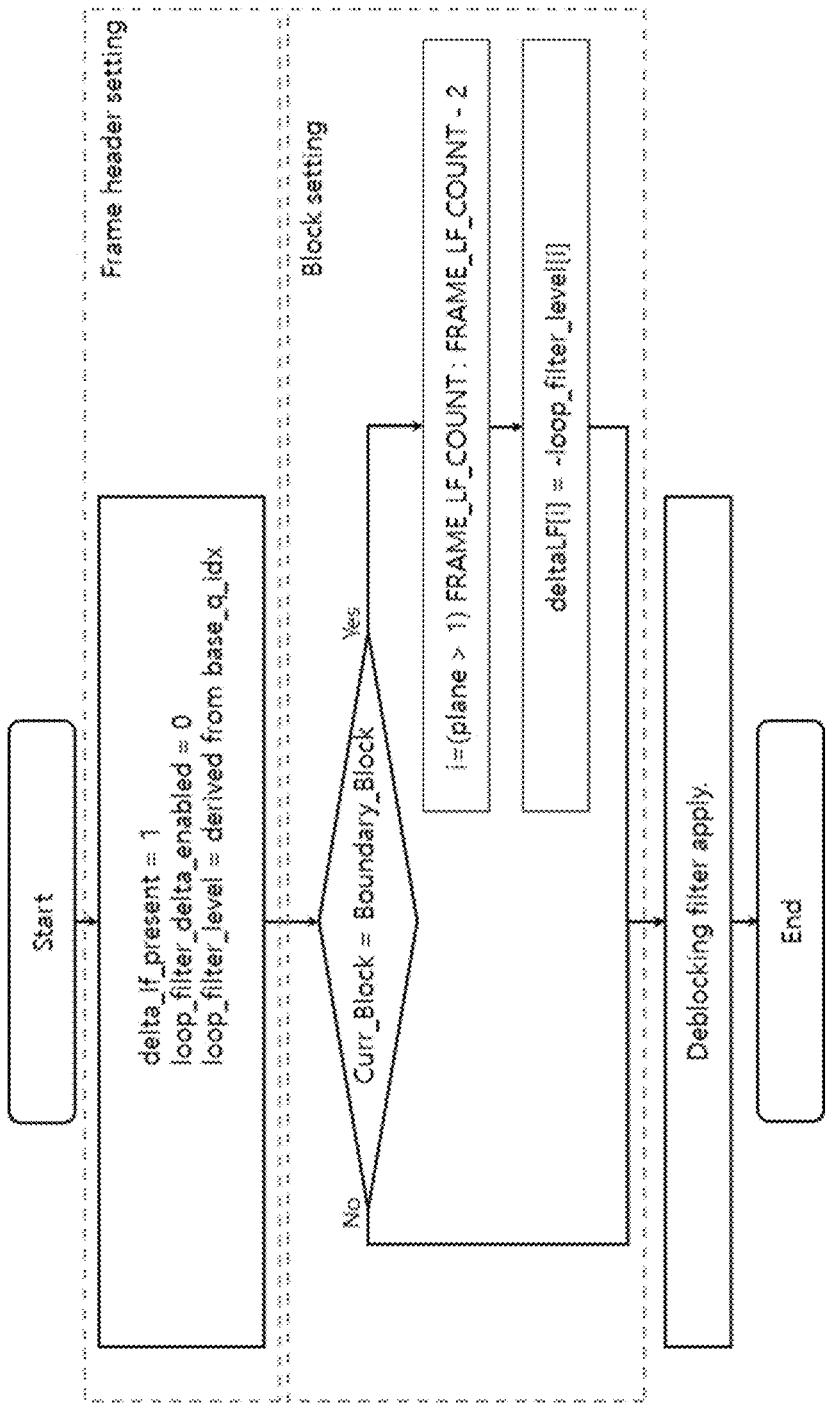
FIG. 8 is a view illustrating a summary of setting DF parameters for a motion-constrained AV1 encoder.

FIG. 8 illustrates a summary of a result of setting the DF parameter for motion-constrained AV1 encoding. In FIG. 8, FRAME_LF_COUNT=4 is defined.

3.2) Limiting Picture Boundary Block Filtering and Limiting Frame Parameter Values of the CDEF The CDEF is set to be disabled at the picture boundary block in the same way as the DF.

3.2.1) Limiting CDEF Filtering at the Picture Boundary Block

The CDEF performs filtering in the unit of 8×8 blocks by default, and adaptively selects and uses 8 dynamic filtering parameter sets included in the frame header in the unit of 64×64 blocks.

Figure 9:
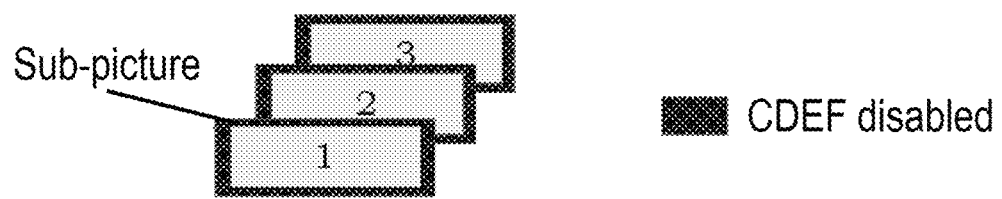
FIG. 9 is a view illustrating limitation to a CDEF of a block on a picture boundary.

Accordingly, in embodiments of the present disclosure, the CDEF is turned off by adjusting a CDEF filtering parameter value of the 64×64 blocks positioned on the picture boundary. That is, if equation cdef_idx[0]=−1 of a superblock of a size of 64×64 is set or equation cdef_idx[0 . . . 3]=−1 of a superblock of a size of 128×128 is set, the CDEF is not performed at that block. Herein, all cdef_idex[0 . . . 3] may not be necessarily set to −1. cdef_idex of the 64×64 blocks corresponding to the picture boundary has only to be set to −1. Since there is no way to directly write cdef_idx with a value of −1 to the bitstream, if the cdef_idx indicates actual strength with a value of 0, CDEF of the corresponding 64×64 block can be disabled. FIG. 9 illustrates the disabled boundary portion of each segmented image.

3.2.2) Limiting a CDEF Parameter Value for Frame Header Synchronization

CDEF filtering parameter values include maximum 64 filter strength values representing a primary strength and a secondary strength for a luma block and a chroma block (cdef_y_pri_strength [ ], cdef_y_sec_strength [ ], cdef_uv_pri_strength [ ], cdef_uv_sec_strength [ ]). Among these filter strength values, maximal 8 filter strength values for each of the luma and the chroma are dynamically calculated according to a video characteristic and is transmitted to a decoder through the frame header.

In various embodiments, the maximal 8 CDEF filter strength values which are the best for the luma and the chroma are experimentally fixed for the frame header synchronization of various segmented images, and are transmitted through the frame header. At least one value in each of the four filter strength arrays should be set to zero. Here, the meaning of the filter strength 0 means CDEF filtering off.

By doing so, compression efficiency may be slightly reduced, but time required to encode can be reduced and integration (stitching) at a bit stream level is possible.

3.3) Limiting Picture Boundary Block Filtering and Limiting Frame Parameter Values of the LRF A block (loop restoration unit (LRU) of a size of 64×64, 128×128, or 256×256 may be selected as a filtering unit of the LRF. In embodiments of the present disclosure, the most appropriate LRU of 64×64 is used to enhance speed and to optimize image quality of blocks other than blocks on the picture boundary. In the Chroma 4:2:0 format, the chroma LRU size should be half of the Luma LRU size.

3.3.1) Limiting LRF Filtering at the Picture Boundary Block

According to the AV1 standards, the LRF is classified into four types, RESTORE_NONE, RESTORE_SWITCHABLE, RESTORE_WIENER, RESTORE_SGRPROJ, and these types of LRFs are selectively used according to the LRU. Accordingly, in embodiments of the present disclosure, the LRF filtering is limited by adjusting the filtering type of the LRU positioned on the picture boundary. That is, equation restoration_type=RESTORE_NONE is set.

3.3.2) Limiting LRF Parameter Values for Frame Header Synchronization

One of the four types of filters is selected as an LRF filtering type (lr_type) of a corresponding frame, and is transmitted to the AV1 frame header. In various embodiments of the present disclosure, lr_type[0 . . . 2]= RESTORE_SWITCHABLE is fixed and used at the frame header of each segmented image. lr_type[0 . . . 2]=RESTORE_SWITCHABLE of the frame header enables restoration_type to be selected as one of the four types of filters in every LRU. Chroma LRF should be disabled in chroma 4:2:2 format, where setting lr_type[0]=RESTORE_SWITCHABLE and lr_type[1 . . . 2]=RESTORE_NONE.

4) Transcoding System

Figure 10:
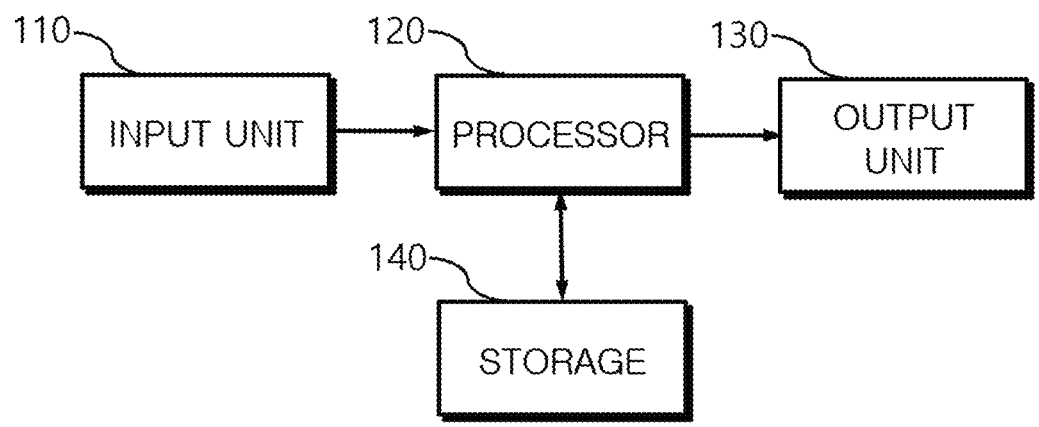
FIG. 10 is a view illustrating a transcoding system according to an embodiment of the present disclosure.

FIG. 10 is a block diagram illustrating a hardware structure of a transcoding system according to an embodiment of the present disclosure. The transcoding system according to an embodiment includes an input unit 110, a processor 120, an output unit 130, and a storage 140 as shown in FIG. 10.

The input unit 110 is a means for receiving an input of image data from an external storage medium, and the processor 120 performs transcoding for tile-based streaming with respect to the inputted image.

The output unit 130 outputs the image transcoded at the processor 120 to a streaming server (not shown). The storage 140 is an internal storage medium providing a storage space necessary for the processor 120 to perform transcoding.

5) Variations

The tile-based encoding method and apparatus suitable to characteristics of the AV1 have been described with reference to preferred embodiments up to now.

In the above-described embodiments, the motion-constrained AV1 encoding method and apparatus for tile-based streaming of an ultra-high definition image are suggested. AV1 encoding technology for encoding tile-based segmented images to allow these to be combined and decoded at the bit stream level without modifying an AV1 standard decoder is suggested.

Accordingly, a tile-based streaming service is possible through motion-constrained AV1 encoding of an ultra-high definition image (360 VR image or panorama image), and a consumer electronic device is enabled to integrate and decode segmented images by using a single standard AV1 decoder.

The technical idea of the present disclosure may be applied to a computer-readable recording medium which records a computer program for performing functions of the apparatus and the method according to the present embodiments. In addition, the technical idea according to various embodiments of the present disclosure may be implemented in the form of a computer-readable code recorded on a computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer-readable code or program that is stored in the computer-readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A motion-constrained encoding method of a tile-based AV1 image, the method comprising:
   segmenting an image into plural tiles;
   determining whether a current block of the plural tiles is positioned on each boundary block of the tiles;
   disabling an in-loop filter on each boundary block of the tiles for determining a motion vector prediction range by modifying a corresponding parameter for the in-loop filter of an AV1 encoder, in response to the current block of the plural tiles being determined to be positioned on each boundary block of the tiles;
   determining the motion vector prediction range for a prediction of a motion vector based on a chroma sampling format and a size of the image, by synchronizing AV1 encoder frame header parameters for each of the plural tiles, and by adjusting the motion vector prediction range depending on the chroma sampling format and the size of the image,
   wherein the determined motion vector prediction range is an area range, of the image, used for the prediction of the motion vector; and
   predicting motion vectors of the plural tiles constituting the image, based on the determined motion vector prediction range.

2. The method of claim 1, wherein the adjusting the motion vector prediction range depending on the chroma sampling format and the size of the image further comprises, in the case of a YCbCr 4:2:0 chroma sampling format, when a prediction is made in the unit of an integer luma pixel, limiting the motion vector prediction range according to the following conditions:
   if CBWS≤8, an X-axis of a X coordinate of a reference image has a range excluding {1, TWBS-1} from [0, TWBS],
   if CBWS>8, the X-axis has a range excluding {1, 3, 5, TWBS-5, TWBS-3, TWBS-1} from [0, TWBS],
   if CBHS≤8, a Y-axis of a Y coordinate of the reference image has a range excluding {1, THBS-1} from [0, THBS], and
   if CBHS>8, the Y-axis has a range excluding {1, 3, 5, THBS-5, THBS-3, THBS-1} from [0, THBS],
   wherein the CBWS (Current Block Width Size) is a preset width size of a current block,
   the CBHS (Current Block Height Size) is a preset height size of the current block,
   the TWBS (Tile Width Block Size) is a preset width size of a tile for the current block, and
   the THBS (Tile Height Block Size) is a preset height size of the tile.

3. The method of claim 1, wherein the adjusting the motion vector prediction range depending on the chroma sampling format and the size of the image further comprises, in the case of a YCbCr 4:2:0 chroma sampling format, when a predication is made in the unit of a factional luma pixel, limiting the motion vector prediction range according to the following conditions:
   if CBWS≤8, a X-axis of a X coordinate of a reference image is [3, TWBS-4],
   if CBWS>8, the X-axis is [6, TWBS-7],
   if CBHS≤8, a Y-axis of a Y coordinate of the reference image is [3, THBS-4], and
   if CBHS>8, the Y-axis is [6, THBS-7],
   wherein the CBWS (Current Block Width Size) is a preset width size of a current block,
   the CBHS (Current Block Height Size) is a preset height size of the current block,
   the TWBS (Tile Width Block Size) is a preset width size of a tile for the current block, and
   the THBS (Tile Height Block Size) is a preset height size of the tile.

4. The method of claim 1, wherein the adjusting the motion vector prediction range depending on the chroma sampling format and the size of the image further comprises, in the case of a YCbCr 4:2:2 chroma sampling format, when a predication is made in the unit of an integer luma pixel, limiting the motion vector prediction range according to the following conditions:
   if CBWS≤8, a X-axis of a X coordinate of a reference image has a range excluding {1, TWBS-1} from [0, TWBS],
   if CBWS>8, the X-axis has a range excluding {1, 3, 5, TWBS-5, TWBS-3, TWBS-1} from [0, TWBS],
   a Y-axis of a Y coordinate of the reference image is [0, THBS]; and
   when a prediction is made in the unit of a fractional luma pixel, limiting the motion vector prediction range according to the following conditions:
   if CBWS≤8, the X-axis is [3, TWBS-4],
   if CBWS>8, the X-axis is [6, TWBS-7],
   if CBHS≤4, the Y-axis is [1, THBS-2],
   if CBHS>4, the Y-axis is [3, THBS-4],
   wherein the CBWS (Current Block Width Size) is a preset width size of a current block,
   the CBHS (Current Block Height Size) is a preset height size of the current block,
   the TWBS (Tile Width Block Size) is a preset width size of a tile for the current block, and
   the THBS (Tile Height Block Size) is a preset height size of the tile.

5. The method of claim 1, wherein the adjusting the motion vector prediction range depending on the chroma sampling format and the size of the image further comprises, in the case of a YCbCr 4:4:4, YCbCr 4:0:0, or an RGB chroma sampling format, when a prediction is made in the unit of an integer luma pixel, limiting the motion vector prediction range according to the following conditions:
   a X-axis of a X coordinate of a reference image is [0, TWBS],
   a Y-axis of a Y coordinate of the reference image is [0, THBS], and
   when a prediction is made in the unit of a fractional luma pixel, limiting the motion vector prediction range according to the following conditions:
   if CBWS≤4, the X-axis is [1, TWBS-2],
   if CBWS>4, the X-axis is [3, TWBS-4],
   if CBHS≤4, the Y-axis is [1, THBS-2],
   if CBHS>4, the Y-axis is [3, THBS-4],
   wherein the CBWS (Current Block Width Size) is a preset width size of a current block, the CBHS (Current Block Height Size) is a preset height size of the current block, the TWBS (Tile Width Block Size) is a preset width size of a tile for the current block, and the THBS (Tile Height Block Size) is a preset height size of the tile.

6. The method of claim 1, wherein the disabling an in-loop filter on each boundary block of the tiles further comprises:

setting a parameter of a deblocking filter (DF) at a tile boundary block as follows:

deltaLF[0 . . . 3]−loop_filter_level[0 . . . 3]; and setting delta_1f_present=1 and loop_filter_delta_enabled=0 at the frame header.

7. The method of claim 6, further comprising setting a loop_filter_level value existing in the frame header to be calculated based on a base_q_idx value, and setting quantization parameter index values of all tile images to be made equal.

8. The method of claim 1, wherein the disabling an in-loop filter on each boundary block of the tiles further comprise:

setting cdef_idx to indicate actual strength with a value of 0 at a tile boundary block; and setting restoration_type=RESTORE_NONE at the tile boundary block; and setting lr_type[0 . . . 2]=RESTORE_SWITCHABLE at the frame header, wherein in case of Chroma 4:2:0 format, a chroma loop restoration unit (LRU) size is a half of the Luma LRU size, wherein the disabling an in-loop filter on each boundary block of the tiles further comprise disabling a loop restoration filter (LRF) in case of a chroma YCbCr 4:2:2 format, by setting lr_type[0]=RESTORE_SWITCHABLE and lr_type[1 . . . 2]=RESTORE_NONE at the frame header, and wherein the RESTORE_SWITCHABLE and RESTORE_NONE are parameter values for the LRF as defined in a AV1 standard.

9. The method of claim 1, wherein the disabling an in-loop filter on each boundary block of the tiles further comprises:

setting each parameter of allow_warped_motion and segmentation_enabled to be zero in a header parameter of a tile-based AV1 image frame;

fixing an interpolation_filter to one identical value in the header parameter of the tile-based AV1 image frame; and fixing a golden frame (GF) group and a key frame interval of an AV1 encoder to a same value.

10. A transcoding system comprising:

a processor configured to:

receive an input of an image;

segment an image into plural tiles;

determining whether a current block of the plural tiles is positioned on each boundary block of the tiles;

disable an in-loop filter on each boundary block of the tiles for determining a motion vector prediction range by modifying a corresponding parameter for the in-loop filter of an AV1 encoder, in response to the current block of the plural tiles being determined to be positioned on each boundary block of the tiles;

determine the motion vector prediction range for a prediction of a motion vector based on a chroma sampling format and a size of the image, by synchronizing AV1 encoder frame header parameters for each of the plural tiles, and by adjusting the motion vector prediction range depending on the chroma sampling format and the size of the image, wherein the determined motion vector prediction range is an area range, of the image, used for the prediction of the motion vector; and predict motion vectors of the plural tiles constituting the image based on the determined motion vector prediction range.

11. A motion-constrained encoding method of a tile-based AV1 image, the method comprising:

predicting motion vectors of plural tiles constituting an image, by applying a motion vector prediction range determined based on a chroma sampling format and a size of the image, the determined motion vector prediction range being determined by synchronizing AV1 encoder frame header parameters for each of the plural tiles, and by adjusting the motion vector prediction range depending on the chroma sampling format and the size of the image, determining whether a current block of the plural tiles is positioned on each boundary block of the tiles, and/or disabling an in-loop filter on each boundary block of the tiles by modifying a corresponding parameter for the in-loop filter of an AV1 encoder, in response to the current block of the plural tiles being determined to be positioned on each boundary block of the tiles, wherein the determined motion vector prediction range is an area range, of the image, used for the prediction of the motion vector; and performing an AV1 encoding of the image by using the predicted motion vectors.

12. The system of claim 10, wherein, for the adjusting the motion vector prediction range depending on the chroma sampling format and the size of the image, the processor is further configured to, in the case of a YCbCr 4:2:0 chroma sampling format, when a prediction is made in the unit of an integer luma pixel, limit the motion vector prediction range according to the following conditions:

if CBWS≤8, an X-axis of a X coordinate of a reference image has a range excluding {1, TWBS-1} from [0, TWBS], if CBWS>8, the X-axis has a range excluding {1, 3, 5, TWBS-5, TWBS-3, TWBS-1} from [0, TWBS], if CBHS≤8, a Y-axis of a Y coordinate of the reference image has a range excluding {1, THBS-1} from [0, THBS], and if CBHS>8, the Y-axis has a range excluding {1, 3, 5, THBS-5, THBS-3, THBS-1} from [0, THBS], wherein the CBWS (Current Block Width Size) is a preset width size of a current block, the CBHS (Current Block Height Size) is a preset height size of the current block, the TWBS (Tile Width Block Size) is a preset width size of a tile for the current block, and the THBS (Tile Height Block Size) is a preset height size of the tile.

13. The system of claim 10, wherein, for the adjusting the motion vector prediction range depending on the chroma sampling format and the size of the image, the processor is further configured to, in the case of a YCbCr 4:2:0 chroma sampling format, when a predication is made in the unit of a factional luma pixel, limit the motion vector prediction range according to the following conditions:
   if CBWS≤8, a X-axis of a X coordinate of a reference image is [3, TWBS-4],
   if CBWS>8, the X-axis is [6, TWBS-7],
   if CBHS≤8, a Y-axis of a Y coordinate of the reference image is [3, THBS-4], and
   if CBHS>8, the Y-axis is [6, THBS-7],
   wherein the CBWS (Current Block Width Size) is a preset width size of a current block,
   the CBHS (Current Block Height Size) is a preset height size of the current block,
   the TWBS (Tile Width Block Size) is a preset width size of a tile for the current block, and
   the THBS (Tile Height Block Size) is a preset height size of the tile.

14. The system of claim 10, wherein, for the adjusting the motion vector prediction range depending on the chroma sampling format and the size of the image, the processor is further configured to, in the case of a YCbCr 4:2:2 chroma sampling format, when a predication is made in the unit of an integer luma pixel, limit the motion vector prediction range according to the following conditions:
   if CBWS≤8, a X-axis of a X coordinate of a reference image has a range excluding {1, TWBS-1} from [0, TWBS],
   if CBWS>8, the X-axis has a range excluding {1, 3, 5, TWBS-5, TWBS-3, TWBS-1} from [0, TWBS],
   a Y-axis of a Y coordinate of the reference image is [0, THBS]; and
   when a prediction is made in the unit of a fractional luma pixel, limiting the motion vector prediction range according to the following conditions:
   if CBWS≤8, the X-axis is [3, TWBS-4],
   if CBWS>8, the X-axis is [6, TWBS-7],
   if CBHS≤4, the Y-axis is [1, THBS-2],
   if CBHS>4, the Y-axis is [3, THBS-4],
   wherein the CBWS (Current Block Width Size) is a preset width size of a current block,
   the CBHS (Current Block Height Size) is a preset height size of the current block,
   the TWBS (Tile Width Block Size) is a preset width size of a tile for the current block, and
   the THBS (Tile Height Block Size) is a preset height size of the tile.

15. The system of claim 10, wherein, for the adjusting the motion vector prediction range depending on the chroma sampling format and the size of the image, the processor is further configured to, in the case of a YCbCr 4:4:4, YCbCr 4:0:0, or an RGB chroma sampling format, when a prediction is made in the unit of an integer luma pixel, limit the motion vector prediction range according to the following conditions:
   a X-axis of a X coordinate of a reference image is [0, TWBS],
   a Y-axis of a Y coordinate of the reference image is [0, THBS], and
   when a prediction is made in the unit of a fractional luma pixel, limiting the motion vector prediction range according to the following conditions:
   if CBWS≤4, the X-axis is [1, TWBS-2],
   if CBWS>4, the X-axis is [3, TWBS-4],
   if CBHS≤4, the Y-axis is [1, THBS-2],
   if CBHS>4, the Y-axis is [3, THBS-4],
   wherein the CBWS (Current Block Width Size) is a preset width size of a current block,
   the CBHS (Current Block Height Size) is a preset height size of the current block,
   the TWBS (Tile Width Block Size) is a preset width size of a tile for the current block, and
   the THBS (Tile Height Block Size) is a preset height size of the tile.

16. The system of claim 10, wherein, for the disabling an in-loop filter on each boundary block of the tiles, the processor is further configured to:
   set a parameter of a deblocking filter (DF) at a tile boundary block as follows:
   deltaLF[0 . . . 3]–loop_filter_level[0 . . . 3]; and
   set delta_1f_present=1 and loop_filter_delta_enabled=0 at the frame header.

17. The system of claim 16, wherein the processor is further configured to set a loop_filter_level value existing in the frame header to be calculated based on a base_q_idx value, and set quantization parameter index values of all tile images to be made equal.

18. The system of claim 10, wherein, for the disabling an in-loop filter on each boundary block of the tiles, the processor is further configured to:
   set cdef_idx to indicate actual strength with a value of 0 at a tile boundary block;
   set restoration_type=RESTORE_NONE at the tile boundary block; and
   set lr_type[0 . . . 2]=RESTORE_SWITCHABLE at the frame header,
   wherein in case of Chroma 4:2:0 format, a chroma loop restoration unit (LRU) size is a half of the Luma LRU size, and
   wherein, for the disabling an in-loop filter on each boundary block of the tiles, the processor is further configured to disable a loop restoration filter (LRF) in case of a YCbCr 4:2:2 chroma sampling format, by setting lr_type[0]=RESTORE_SWITCHABLE and lr_type[1 . . . 2]=RESTORE_NONE at the frame header, and
   wherein the RESTORE_SWITCHABLE and RESTORE_NONE are parameter values for the LRF as defined in a AV1 standard.

19. The system of claim 10, wherein, for the disabling an in-loop filter on each boundary block of the tiles, the processor is further configured to:
   set each parameter of allow_warped_motion and segmentation_enabled to be zero in a header parameter of a tile-based AV1 image frame;
   fix an interpolation_filter to one identical value in the header parameter of the tile-based AV1 image frame; and
   fix a golden frame (GF) group and a key frame interval of an AV1 encoder to a same value.

* * * * *